United States Patent Office 3,678,012
Patented July 18, 1972

3,678,012
METHOD OF PRODUCING PHOSPHORUS-CONTAINING CURABLE MATERIAL
Hideaki Matsuda, Marugame, Hisakazu Mori, Kagawa-ken, and Fujio Yamauchi, Kanongi, Japan, assignors to Okura Kogyo Kabushiki Kaisha, Takamatsu-shi, Kagawa-ken, Japan
No Drawing. Filed Oct. 15, 1970, Ser. No. 81,188
Claims priority, application Japan, Dec. 23, 1969, 44/104,001
Int. Cl. C08g 22/16
U.S. Cl. 260—77.5 AR
14 Claims

ABSTRACT OF THE DISCLOSURE

Phosphorus-containing curable products useful for the production of flame-resistant materials are provided herein, said products prepared by the addition reaction of an oxirane compound with polymerizable mixed phosphates represented by the following general formula:

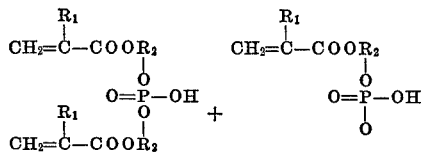

wherein $R_1$ represents a hydrogen or a methyl group, and $R_2$ represents a lower alkylene group or a halogenated lower alkylene group, mixing the produced reaction products with polymerizable monomers to dissolve thereof, optionally adding polyhydric alcohols thereto, and reacting thereof with a polyisocyanate.

---

The present invention relates to phosphorus-containing curable substances useful as raw materials for flame-resistant materials and a process for preparation thereof. More particularly, the present invention relates to phosphorus-containing curable substances useful as raw materials for flame-resistant materials and a process for their preparation, characterized by the addition reaction of oxirane compounds with polymerizable mixed phosphates represented by the following general formula:

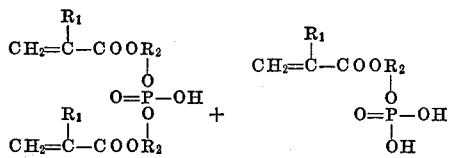

(wherein $R_1$ represents a hydrogen or a methyl group, and $R_2$ represents an alkylene group such as an ethylene group and a propylene group, or a halogenated alkylene group such as chloropropylene), mixing the produced reaction products with polymerizable monomers to dissolve thereof, adding polyhydric alcohol thereto if necessary, and reacting thereof with polyisocyanate.

Heretofore, organic synthetic resins have been utilized in many fields, but lately the range of their usage and the consumption have been on the increase and it is considered that this trend will continue in the future.

Most of the organic synthetic resins which are generally used are more or less combustible. This fact alone is not necessarily a serious defect in using them, but lately in particular, the organic synthetic resins utilized as the construction materials are required to have higher flame-resistant properties or to be resin materials which are non-combustible. Also, in other fields where the resin materials are used, they are frequently required to have flame-resistant properties, non-combustion properties or delayed combustion properties as the range of their usage is widened, and it is considered that such demants will be increased in the future.

It must be said that the research for an advantageous process for preparing synthetic resin materials having excellent flame-resistant properties is extremely important.

The present inventors have invented the present invention as a result of a research for an advantageous process for the preparation of the raw material compositions for obtaining novel curable substances having excellent flame-resistant properties.

Namely, the inventors have invented the present process which comprises the steps of the addition reaction of an oxirane compound with polymerizable mixed phosphates represented by the aforesaid general formula, mixing the produced reaction products with polymerizable monomers to dissolve thereof, adding polyhydric alcohol thereto if necessary, and then reacting thereof with a polyisocyanate.

The polymerizable mixed phosphates represented by the aforesaid general formula can be produced by the reaction of phosphorus pentoxide with methacrylate or an acrylate containing hydroxyl groups represented by the general formula

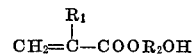

($R_1$ and $R_2$ are the same in the aforesaid formula).

These polymerizable mixed phosphates may be produced in the following specific manner:

A methacrylate or an acrylate compound containing hydroxyl groups of a fixed quantity are placed in a reaction vessel, and a phosphorous pentoxide equivalent is added gradually to react with the hydroxyl groups in the methacrylate or acrylate compound at temperatures ranging from room temperatures to 80° C. (preferably from room temperature to 60° C.) under the presence or absence of inert solvent. After the addition, the mixture is heated at temperatures ranging from 60 to 95° C. for 3 to 15 hours with sufficient agitation to effect the reaction whereby the polymerizable mixed ester phosphate is produced.

The addition reaction between the mixed phosphates and the oxirane compounds in the present invention is an esterification reaction in that the epoxy groups are added to the P—OH groups in the mixed phosphates which reaction progresses extremely easily. This reaction is carried out by first pouring the mixed phosphates into a container, then agitating well and simultaneously adding a predetermined quantity of the oxirane compound thereto at room temperature up to about 70° C., thereafter agitating thereof for 0.5 to 8 hours at the predetermined temperature. In this case, the preferable ratio of the mixed phosphates to the oxirane compound is set so as to extinguish the acid value in the reaction system or to reduce the acid value sufficiently. For example, more than one of the oxirane compounds are suitable for reaction with a P—OH group in the mixed phosphates, and preferably the ratio is about 1.4 moles of the oxirane compound per mole of the P—OH group. As examples of the usable oxirane compounds, ethylene oxide, propylene oxide, butylene oxide, epichlorohydrin, epibromohydrin and the like may be mentioned. Further, polymerizable oxirane compounds such as glycidyl methacrylate are available. In the present invention, these compounds may be used singly or in combination and an oxirane compound containing halogen (for instance epichlorohydrin) is preferably used in order to further improve the flame-resistant properties.

The addition reaction products which are produced thus include hydroxyl groups to which a polyisocyanate is added and is urethanated. However, in this case it is preferable to mix and dissolve the addition products with the polymerizable monomers beforehand. As the polymerizable monomers to be used in this invention, components selected from styrene, methyl methacrylate, ethyl methacrylate, butyl methacrylate and divinyl benzene, may be used therein, singly or in combination, (i.e. mixtures thereof). These polymerizable monomers are extremely advantageous because they effectively act as solvents in the urethanation reaction. If the urethanation reaction is conducted by adding a polyisocyanate to the addition reaction products without using such solvent, the viscosity in the reaction system increases remarkably as the progress of the reaction and the agitation cannot be carried out smoothly. Further, it is very advantageous that the used polymerizable monomers can be utilized as one of the components in the curable composition after the urethanation reaction.

The quantity of the polymerizable monomers is not particularly critical but it is preferable to use these materials in the weight ratio of ⅓ to 1.5 to the urethanation reaction products. Further, the monomers can coexist at the addition reaction stage of the aforesaid oxirane compound.

In some cases, the urethanation reaction can be carried out by mixing the reactants with polyhydric alcohols having preferably at least three hydroxyl groups therein, namely, such materials as trimethylolethane, trimethylolpropane, trimethylolbenzene hexane triol, pentaerythritol and the like may be used. The quantity of such polyhydric alcohols to be mixed is preferably set so that the ratio of the number of hydroxyl groups in the addition reaction products to the number of hydroxyl groups in the polyhydric alcohols is greater than 5.

As the polyisocyanate material to be used in this invention, may be mentioned, such materials as tolylenediisocyanate, diphenylmethanediisocyanate, 3,3'-bitolylene 4,4'-diisocyanate, metaxylylene-diisocyanate, hexamethylene-diisocyanate and the like, which materials may be used singly or in admixture.

The urethanation reaction is performed by adding a predetermined quantity of polyisocyanate to the reaction system and agitating thereof sufficiently at room temperature up to about 110° C. (preferably from 70 to 95° C.). The quantity of polyisocyanate to be used in this invention is not critical, but 0.7 to 1 isocyanate group per hydroxyl group is preferably used in the reaction system.

The present invention is chiefly characterized in that it is a method which may be advantageously employed on an industrial scale.

The reaction products which are obtained thus are the novel phosphorus-containing curable substances compound of polymerizable monomers and phosphorus-containing urethane compounds having polymerizable double bonds. As these materials also contain nitrogen atoms, they have effective flame-resistant properties. Accordingly, the cured substances produced from the aforesaid substances are insoluble, non-fusible, rigid and tough and are superior flame-resistant substances. These products also have superior adhesive property to metals or other various materials.

As described in the foregoing passages, the phosphorus-containing curable substances obtained in accordance with the present invention are available as the raw materials for flame-resistant materials or for molding materials, paints, adhesives, and many other materials.

The present invention may be explained more concretely in accordance with the following examples:

EXAMPLE 1

377 grams of epichlorohydrin are gradually added to 678 grams of mixed phosphates (acid valve 243) produced by the reaction of phosphorus pentoxide and β-hydroxychloropropyl methacrylate for 50 minutes, whereas the reaction mixture is agitated sufficiently at room temperature and cooled from the outside to eliminate the heat of reaction. The agitation was continued for 5 hours at constant temperature from 60 to 65° C. after the addition.

Epoxy groups in the reaction product were eliminated and the acid value was 8.5. The reaction product was mixed and dissolved into 800 grams of methylmethacrylate to form a uniform composition, to which 228 grams of tolylenediisocyanate were added, being agitated sufficiently at 80 to 90° C. for 4 hours.

Thus, the urethanation reaction product was produced quantitatively, which product was a light yellow, transparent and viscous liquid substance. 0.35 weight percent of methyl ethyl ketone peroxide (to be abbreviated as MEKPO) was added to the urethanation reaction product and the reaction was continued for 6 hours at 50° C. and for 10 hours at 90 to 100° C. The insoluble and non-fusible extremely tough superior cured substance was produced. It was examined in accordance with ASTM D 635–63 and as the result of which it was judged to be a flame-resistant non-burning substance.

EXAMPLE 2

382 grams of epichlorohydrin were gradually added to 532 grams of the mixed phosphate (acid value 312) produced by the reaction of phosphorus pentoxide and hydroxyethylmethacrylate for one hour, whereas the reaction mixture was agitated sufficiently at room temperature. The reaction product with the acid value 7.6 was obtained by a procedure similar to Example 1 (epoxy group eliminated). It was dissolved into a mixture of 500 grams of methylmethacrylate and 200 grams of methylacrylate to form a uniform composition, to which 230 grams of tolylenediisocyanate were added and agitated fully at 75 to 85° C. for 5 hours.

Thus the urethanation reaction product was produced quantitatively, which product was a light-yellow, transparent, and viscous liquid substance. 0.3 weight percent of MEKPO was added to the urethanation reaction product and the reaction was continued for 5 hours at 45° C. and for 10 hours at 90 to 100° C. An insoluble and non-fusible hard and tough extremely superior cured substance was obtained. This material was similarly examined in accordance with ASTM D 635–63 and determined to be flame-resistant.

EXAMPLE 3

A reaction product was produced from 377 grams of epichlorohydrin and 678 grams of the mixed phosphates (acid value 243) produced by the reaction of phosphorus pentoxide with β-hydroxychlorophyl methacrylate similar to Example 1, and was dissolved into the mixture of 300 grams of styrene and 600 grams of methylmethacrylate, to which 13 grams of trimethylol propane were further added to form a uniform composition. 250 grams of tolylenediisocyanate were added to the composition, being agitated fully at 80 to 95° C. for 4.5 hours. Thus, the urethanation reaction product was produced quantitatively, which product was a light-yellow, transparent, and viscous liquid substance. 0.3 weight percent of MEKPO was added to the urethanation reaction product and the reaction was continued for 5 hours at 50° C. and for 10 hours at 90 to 105° C. An insoluble, nonfusible, hard, and extremely superior and tough, cured material was obtained. It was examined in accordance with ASTM D 635–63 and also found to be flame-resistant.

EXAMPLE 4

383 grams of epichlorohydrin were gradually added to 635 grams of the mixed phosphates (acid value 261) produced by the reaction of phosphorus pentoxide upon β-hydroxychloropropylacrylate for one hour, said reaction mixture being agitated fully. The procedure was carried out in a manner similar to Example 1. The acid value of the reaction product was 8.2, (epoxy group was eliminated), which was dissolved into 900 grams of methylmethacrylate and to which 12 grams of trimethylolethane were further added to form a uniform composition. 255 grams of tolylenediisocyanate were added and the mixture was agitated fully at 70–80° C. for 5 hours.

Thus, the urethanation reaction product was produced quantitatively, which product was a light-yellow, transparent, viscous liquid substance. 0.25 weight percent of MEKPO was added to the urethanation reaction product and the reaction was continued for 5 hours at 40° C. and for 9 hours at 30 to 90° C. An insoluble, non-fusible, hard and extremely tough superior cured substance was obtained. It was examined in accordance with ASTM D 635–63 and found to be flame-resistant.

The cured substances produced in the aforesaid examples have extremely superior properties. The properties of the cured substances produced, for instance, in Example 1 and Example 3 are listed in the following table. Further, the properties of unsaturated polyester resins cured under conditions identical with that of Example 1 are listed below to facilitate the comparison.

|  | Example | | |
|---|---|---|---|
|  | 1 | 3 | Polyester |
| Thermaldeformation temperature (° C.) | 98 | 103 | 79 |
| Tensile strength (kg./cm.²) | 780 | 832 | 571 |
| Flexural strength (kg./cm.²) | 1421 | 1576 | 1060 |
| Impact strength (kg. cm./cm.) | 1.65 | 1.76 | 1.42 |
| Compressive strength (kg./cm.²) | 1,456 | 1,495 | 1,400 |
| Rockwell hardness | M 113 | M 113.5 | M 108 |

(The test was conducted in accordance with ASTM.) Further, the curable compositions in accordance with the present invention can interconnect metal sheets tightly when they are cured between plates such as steel plates and aluminum plates.

What we claim is:

1. A method of producing phosphorus-containing curable materials characterized by (1) mixing and reacting by addition reaction, an oxirane compound and polymerizable mixed phosphates represented by the following general formula:

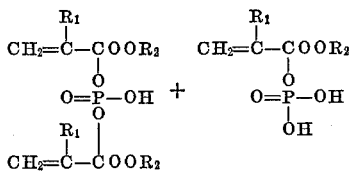

wherein $R_1$ represents a hydrogen or a methyl group, and $R_2$ represents a lower alkylene group or a halogenated lower alkylene group, (2) mixing the product of (1) with a polymerizable monomer to dissolve the reaction product, and reacting thereof with a polyisocyanate to produce said curable materials.

2. A process according to claim 1 wherein the addition reaction between the polymerizable mixed phosphates and the oxirane compound is conducted at a temperature between room temperature and about 70° C.

3. A process according to claim 1 wherein the polyisocyanate is reacted at a temperature of between room temperature and about 110° C.

4. A process according to claim 1 where the polymerizable monomers are selected from the group consisting of styrene, methyl methacrylate, ethyl methacrylate, butyl methacrylate, and divinyl benzene and mixtures thereof.

5. A process according to claim 1 where the lower alklene group is selected from the group consisting of ethylene and propylene.

6. A product produced by the method of claim 1.

7. A method according to claim 1 wherein polyhydric alcohols are added to the reaction mixture after the reaction between the polymerizable mixed phosphates and the oxirane compound.

8. A method of producing phosphorus-containing curable materials characterized by (1) mixing and reacting by addition reaction, an oxirane compound and polymerizable mixed phosphates at a temperature between room temperature and about 70° C., said phosphates represented by the formula:

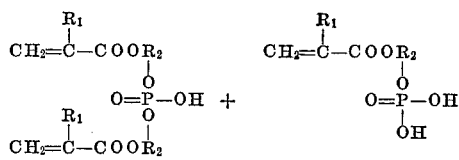

wherein $R_1$ represents a hydrogen or a methyl group, and $R_2$ represents a lower alkylene group or a halogenated lower alkylene group, (2) mixing the product of (1) with a polymerizable monomer selected from the group consisting of styrene, methyl methacrylate, ethyl methacrylate, butyl methacrylate, divinyl benzene and mixtures thereof to dissolve the reaction product and reacting thereof with a polyisocyanate at a temperature between room temperature and about 110° C. to produce said curable materials.

9. A method according to claim 8 wherein polyhydric alcohols are added to the reaction mixture after the reaction between the polymerizable mixed phosphates and the oxirane compound.

10. A method according to claim 8, wherein the reaction between the oxirane compound and the mixed phosphates takes place during the time interval of 0.5 to 8 hours.

11. A method according to claim 10 wherein the mole ratio of the oxirane compound to the P–OH group in the mixed phosphates is 1.4 to 1.

12. A method according to claim 11, wherein the oxirane compound is selected from the group consisting of ethylene oxide, propylene oxide, butylene oxide, epichlorohydrin, and epibromohydrin.

13. A method according to claim 12, wherein the oxirane compound is epichlorohydrin.

14. A method according to claim 12, wherein the oxirane compound is epibromohydrin.

References Cited

UNITED STATES PATENTS 3,517,090    6/1970    Friedman _____ 260—77.5 AR
3,578,793    4/1971    Carroll et al. ____ 260—77.5 AR DONALD E. CZAJA, Primary Examiner M. J. WELSH, Assistant Examiner U.S. Cl. X.R.

156—331; 260—77.5 CR, 941